United States Patent
Chen et al.

(10) Patent No.: US 8,370,602 B2
(45) Date of Patent: Feb. 5, 2013

(54) METHOD FOR MEMORY SPACE MANAGEMENT

(75) Inventors: Ming-Dar Chen, Hsinchu (TW); Hsiang-An Hsieh, Shjhih (TW)

(73) Assignee: A-Data Technology Co., Ltd., Taipei (TW)

( * ) Notice: Subject to any disclaimer, the term of this patent is extended or adjusted under 35 U.S.C. 154(b) by 841 days.

(21) Appl. No.: 12/292,572

(22) Filed: Nov. 21, 2008

(65) Prior Publication Data

US 2009/0300082 A1    Dec. 3, 2009

(30) Foreign Application Priority Data

Jun. 2, 2008 (TW) ................................ 97120405 A

(51) Int. Cl.
*G06F 12/10* (2006.01)
(52) U.S. Cl. ......... 711/202; 711/165; 711/206; 711/207
(58) Field of Classification Search .................. 711/202, 711/206, E12.058
See application file for complete search history.

(56) References Cited

U.S. PATENT DOCUMENTS

2007/0186065 A1 * 8/2007 Lee et al. .................. 711/159
2008/0195799 A1 * 8/2008 Park ............................ 711/103

* cited by examiner

*Primary Examiner* — John Lane
(74) *Attorney, Agent, or Firm* — Rosenberg, Klein & Lee

(57) ABSTRACT

A method for memory space management is disclosed. It uses a resident program loaded into an operation system or the controller of a storage device to monitor the storage space and the resource allocation of the file system of the storage device. The status of the logical address with an erased and invalid data mapped with a physical block is checked via a L2P mapping table. By using a data erase instruction, the controller modifies the L2P mapping table to cancel the link relation between the physical block and the logical address and erase the physical block to release the memory space. Finally, the check location is stored for a next check. The method for memory space management improves the access speed and the usage life of the storage device.

6 Claims, 7 Drawing Sheets

METHOD FOR MEMORY SPACE MANAGEMENT

BACKGROUND OF THE INVENTION

1. Field of the Invention

The present invention relates to a method for memory space management. In particular, the present invention uses a resident program to monitor the memory space and the file system allocation to release the memory space that has been occupied by invalid data.

2. Description of Related Art

The application system of a computer usually uses the file system to access the storage device. The addressing method of the file system is a logical block address (LBA) that uses the sector with a capacity of 512 bytes as a unit. When the storage device records a data, a physical block address that can clearly and accurately address the location of the data is used to address the allocation, such as address location within a device, a memory block, or a memory page, etc. The logical-to-physical address translation is meant to perform a translation between the logical address that is accessed by the application system and the physical address that stores data.

The relation between the logical address and the physical address is shown in FIG. 1. The address for the logical address 11 is from 0 to 2047999. In this example, each address corresponds to a memory capacity with 512 bytes. The memory is divided into a plurality of segments, including segment 0 to segment 31. The logical address 0 to 63999 forms a segment (i.e. segment 0). In the figure, the relation between the logical block address (LBA) 12 and the physical block address (PBA) 14 is mapped by a logical-to-physical mapping table (L2P mapping table) 13.

Each segment is divided into 256 logical block addresses 12, wherein 6 out of the 256 logical block addresses 12 are reserved as the spare blocks (or so called free blocks). In physical block addresses 14, 250 out of 256 physical blocks (i.e. 6 logical block address are reserved therefore 6 logical blocks are reserved, which leaves 250 physical blocks) correspond to 250 logical blocks. Therein 6 physical block addresses 14 are reserved as the spare blocks (or so called free blocks) for recording the control data, such as storing the logical-to-physical mapping table 13, replacing the bad block, or storing the updated data when data is updated. When data is updated and stored to a new block, the original physical block which stores data is erased and released to be the spare block.

For the logical address 11, there are 32 segments (segment 0~31). Each segment includes 250 logical blocks (i.e. 256 logical block address 12 with 6 logical block address reserved therefore there are 250 logical blocks). Each logical block corresponds to a physical block via the logical-to-physical mapping table 13, and can store 128 KB data. For meeting the capacity of the memory page of the physical block, the logical block is divided into 64 continuous memory pages. Each memory page is 2 KB and includes 4 continuous sectors, it means that each logical block includes 256 continuous sectors.

For the physical address, each segment includes 256 physical blocks, and each physical block includes 64 memory pages that can store 128 KB data and is mapped to a logical block via the logical-to-physical mapping table 13. The physical block (i.e. should have 6 free blocks) that is not mapped to the logical block can be the spare block, a bad block (not shown in the figure) due to the physical block is bad, or a boot block.

In the mapping relation between the logical address space and the physical address shown in FIG. 1, each address of the logical addresses 11 represents a sector that can store 512 bytes data. The logical address 11 is divided by the capacity of the block unit (the capacity of each of the logical block (128K) is equal to 256 sectors, this means 128 KB user data). The quotient is the logical block address 12. The remainder is divided by the capacity of the memory page unit to represent the quantity of the sectors. For example, the capacity of the memory page unit (2 KB) represents 4 continuous sectors so that the logical page address can be calculated. The logical address (100/256=0 with reminder of 100) corresponds to the logical block address 0, and corresponds to the memory page address 25 (100/4=25). The logical address (256/256=1 with reminder of 0) corresponds to the logical block address 1, and corresponds to the memory page address 0.

Therefore, after the application system obtains the logical block address 12 via the file system, the application searches the logical-to-physical mapping table 13 to find out the corresponding physical block address 14. In the prior art, in order to reduce the space for storing the logical-to-physical mapping table 13, the logical-to-physical mapping table 13 is divided into a plurality of segments. Each segment is mapped by a logical-to-physical mapping table 13. The mapping relation between a continuous logical addressing space and a continuous physical addressing space for each segment is recorded by an independent logical-to-physical mapping table. For example, segment 0 stores the logical address 0~63999, and the mapping relation between the logical block addresses 0~249 (250 logical blocks that is equal to the 32 MB user data and the physical block addresses 0~255 (256 physical memory blocks, with 6 unmatched free blocks). Similarly, segment 31 stores the logical addresses 1984000~2047999, and the mapping relation between the logical block addresses 7750~7999 (250 logical blocks that is equal to the 32 MB user data and the physical block addresses 7936~8191 (256 physical memory blocks, with 6 unmatched free blocks).

Because the mapping relation between the logical block address and the physical block address is continuous, the segment number for storing the logical block can be easily obtained by dividing the logical block address by the quantity of the logical blocks of a single segment. Next, the logical-to-physical mapping table 13 for the segment is loaded and searched to find out the physical block address 14 for storing the user data of the logical block.

However, the file system for the application system usually is designed for a magnetic storage medium (such as a hard disk). For example, the file systems for Microsoft operation system (FAT16, FAT32, NTFS, etc) or Mac OS (HFS, HFS+, etc) directly erase the allocation in the allocation table or the allocation bit-map when a file is erased. For example, for the FAT file system, the file erasing operation is merely implemented by erasing the file name in the root direction or the sub direction, and recovering the cluster chain occupied by the file to zero.

The above operation for the storage device of the prior art is to perform a writing operation for updating data to the logical address. It cannot obtain the status of the data stored on the physical address (i.e. valid or invalid). It also has the same drawbacks for the flash memory. Furthermore, when an updating operation or an erasing operation is executed, the access speed is affected and the usage life of the storage medium is reduced due to the physical block is occupied by the invalid data and the invalid data is moved.

SUMMARY OF THE INVENTION

One particular aspect of the present~invention is to solve the problem of the physical memory blocks occupied by an invalid data (herein, the invalid data is the data that has been deleted by the user, yet still actually exists in physical block and merely has its file name erased from the root directory). The present invention provides a method for memory space management. It uses the resident program to monitor the storage space and the resource allocation of the file system periodically or according to the user's instruction. When a logical address having the invalid and deleted data corresponding to a complete physical block is checked and found, the address corresponding to the physical block is read via the logical-to-physical mapping table. Next, a data erase instruction is generated to the controller of the storage device. The controller cancels the link relation between the physical block and the logical block, and erases the physical block to release the storage space. Finally, the location of the file system being checked is stored. Alternatively, the above steps are executed to check the next location of the file system to release the storage space occupied by invalid data.

The present invention applies the above data erasing steps to the memory space management. The present invention uses the resident program for monitoring the system memory and the file system operation, or the present invention can use the controller of the storage device to perform the monitoring operation. Before operating the monitoring process, the controller needs to identify the partition table and the file system. The type of the partition table and the file system is supported by the controller, the controller checks the file system to determine whether the logical block/page is allocated or not.

Next, if the logical block address has not been allocated and mapped to a physical block address in a L2P mapping table, then the L2P mapping table is modified to delete the link relation between the logical block address and the physical block address, and erase the physical block. Finally, the location that has been checked is stored. Thereby, the access speed of the storage device is improved and the usage life of the storage medium is prolonged.

For further understanding of the present invention, the following detailed descriptions illustrate the embodiments and examples of the present invention. The description is for illustrative purpose only and not intended to limit the scope of the claim.

BRIEF DESCRIPTION OF THE DRAWINGS

The drawings included herein provide a further understanding of the invention. A brief introduction of the drawings is as follows.

DETAILED DESCRIPTION OF PREFERRED EMBODIMENTS

Under the operation of the file system of the prior art, the file erase operation merely erases the file name in the direction, and resets the cluster chain occupied by the file to zero. It does not really erase the physical memory space.

In order to improve the above problem, the present invention provides a method for memory space management. The application system executes a resident program to check the file system allocation of the storage device. When a storage space has been allocated (i.e. occupied by invalid data) and when the continuous space of such storage space reaches the capacity of the erase unit of the storage device, the controller of the storage device will release the physical memory block allocated to the logical block. In other words, when a storage space that has been allocated by invalid data is found, the storage space is only released when its size reaches a minimum (i.e. equal to the capacity of the erase unit of the storage device).

Figure 1:
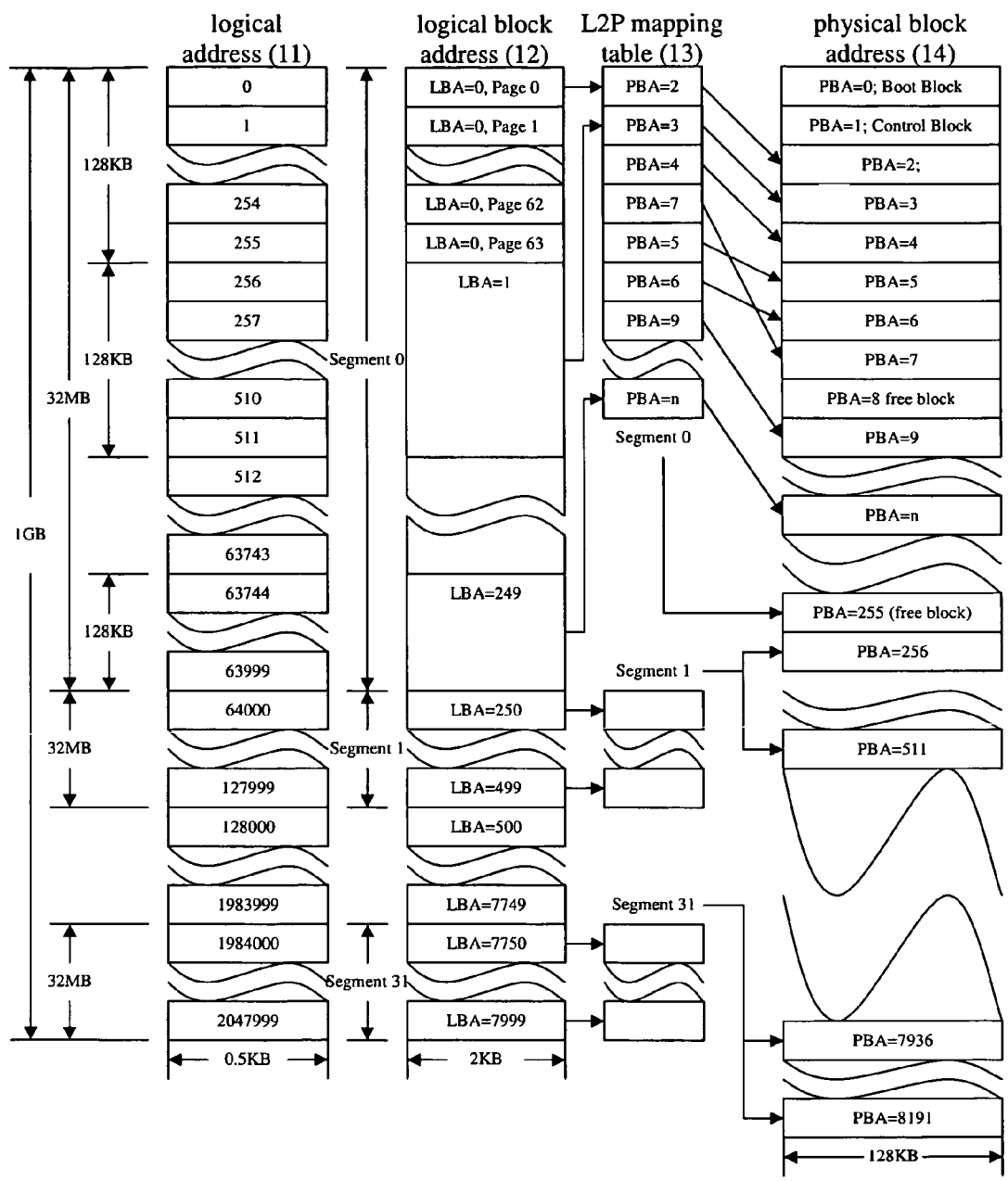
FIG. 1 is a schematic diagram of the mapping relation between the logical block address and the physical block address of the prior art.
Figure 2:
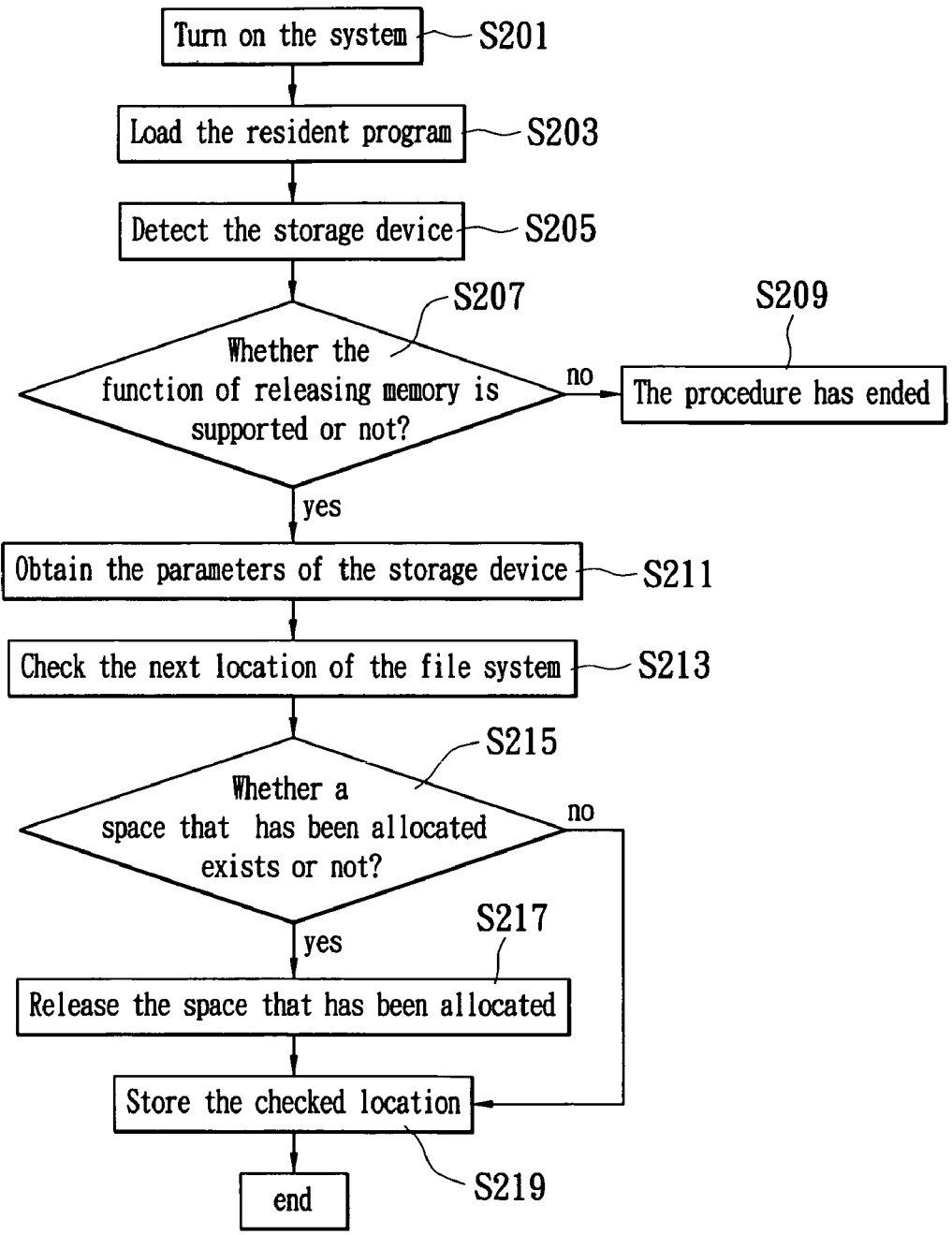
FIG. 2 is a flow chart of a resident program that is used for checking the file system to release the free physical memory block.

When the application system is turned on, the resident program is automatically loaded to monitor the resource allocation between the storage space and the file system to release the physical memory block that is occupied and has the invalid data. FIG. 2 shows the flow chart of the resident program that is used for checking the file system to release the free physical memory block.

When a system (i.e. a computer system) is turned on (step S201), a resident program for monitoring the file system is loaded (S203). The resident program can check the file system to release the free physical memory block of the storage device, including checking the allocation table, the file label under the directory, or the status of the cluster chain. When the system turns on, the resident program checks whether a previous record exists or not. When the system is turned on the first time to execute the resident program, a default value is loaded to check the file system. When it is not the first time, a previous location that has been checked is loaded in order to continuously check the file system (i.e. in order to ensure the continuity of the file system check).

Next, the system detects the built-in storage device or the external storage device (S205) in order to confirm whether the controller of the storage device supports the function of releasing the physical memory block or not (S207). If the controller of the storage device does not support the function of releasing the physical memory block, the procedure is ended (S209). When the controller of the storage device supports the function of releasing the physical memory block, then obtains the parameters of the storage device (S211), including the block capacity of the storage device, the number of the memory page in the block, the capacity of the memory page, the manufacturer, or the other information of the storage device.

Next, the next location of the file system is checked (due to the previous check procedure is finished) (S213). According to the partition table and the type of the file system, the logical block/page is checked whether it has a mapping physical memory block or not, wherein the mapping physical memory block is occupied by the invalid data which not used. (S215). When the logical block/page is allocated, the check record is stored (S219), such as the location that has been checked.

If the logical block is not allocated, and the capacity of a continuous memory space at least equals the capacity of the erase unit of the storage device, an instruction is issued to release the memory space occupied by the invalid data (S217), and stores the check record (S219). After the check procedure is finished, the resident program performs a next check to determine whether a logical block is allocated or not within a pre-determined time period according to the setting.

Figure 3:
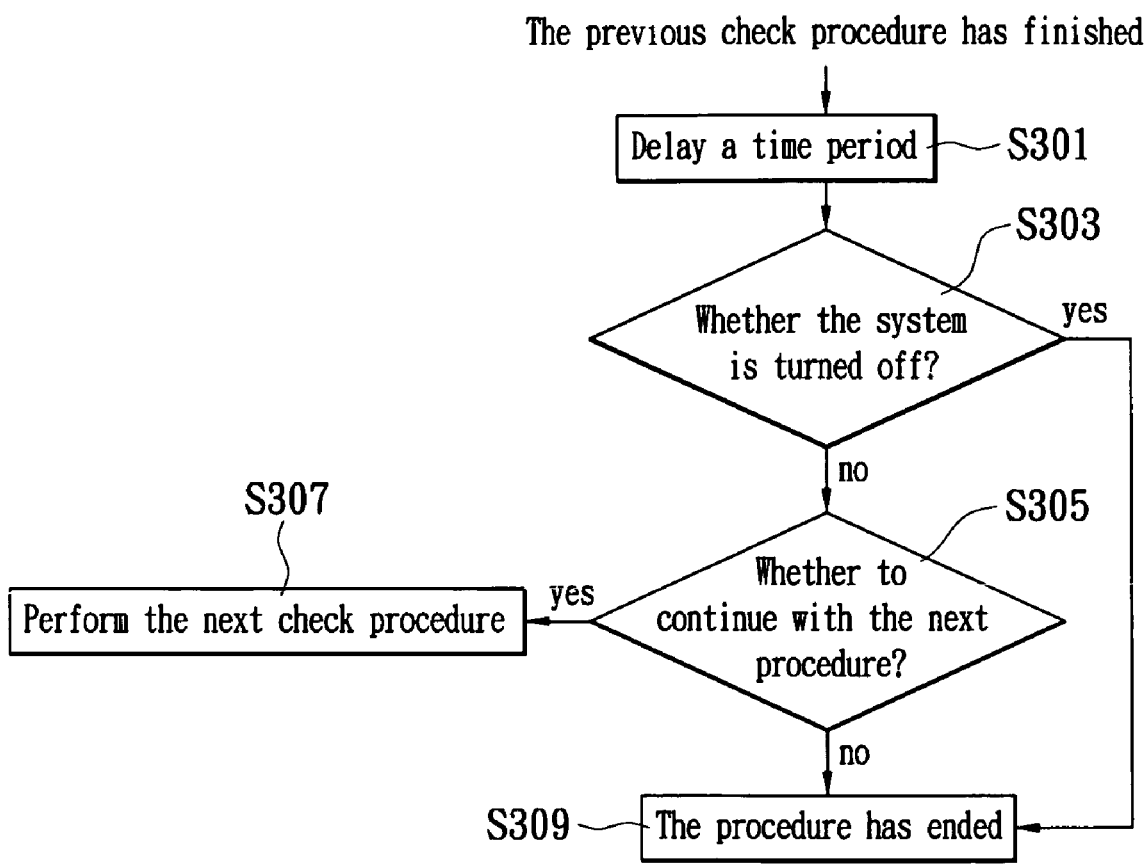
FIG. 3 is a flow chart of the system procedure after the check operation is finished.

FIG. 3 shows the system procedure after the previous check is finished. The resident program will perform a general determination rule. For example, after a delay, or a pause instruction is executed (S301), it is determined whether the computer system is turned off or not (S303). When the computer system is turned off, the procedure is ended (S309). Or else, the resident program determines whether to continue with executing operations (S305). When the operations continue, the procedure ends (S309). When the operations continue, the resident program performs a next check operation (S307).

Figure 4:
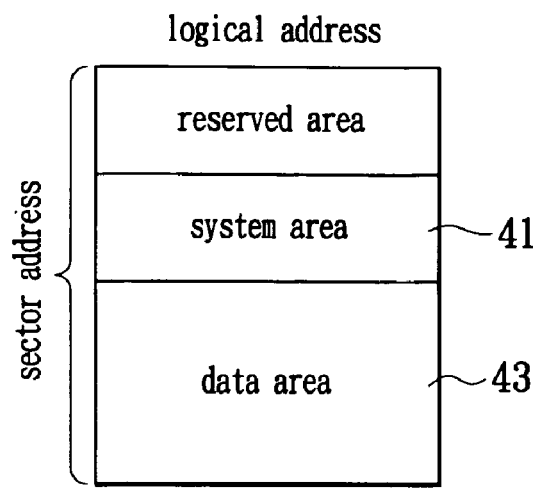
FIG. 4 is a schematic diagram of the content on the logical address.

According to the above procedures, the method for memory space management of the present invention involves the addressing method of the file system, including utilizing the logical address (LA), the physical block address (PBA), the logical block address (LBA), and the L2P mapping table. FIG. 4 shows the schematic diagram of the content on the logical address.

Each address in the logical addresses represents a sector. In addition to corresponding to the sector that is not the reserved sector (i.e. 250 out of 256 sectors are not reserved), the addresses also include the sector addresses of the system area 41 and the sector addresses of the data area 43. The system area 41 includes the sectors of partition table, the sectors of BIOS parameter block (BPB), and the sectors of file system, etc. The data area 43 records the sectors for storing data. The data area 43 can be addressed by cluster, such as 4K. The present invention uses the size of the invalid data on the data area of the logical address and the mapping relation between the logical address and the physical address to check whether the logical block/page is free (i.e. not occupied by invalid data) or not.

Figure 5:
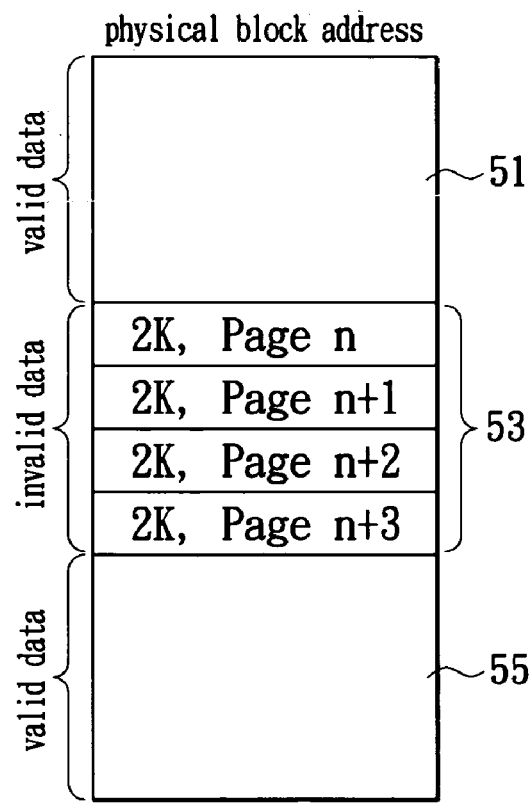
FIG. 5 is a schematic diagram of the logical address with invalid data that is mapped to the physical block.

Reference is made to FIG. 5, which shows a schematic diagram of the logical address with invalid data that is mapped to the physical block, and includes valid data 51, 55 and invalid data 53 on the physical block. In this embodiment, according to the information of the file system, the size of invalid data 53 on the data area of the logical address is 2 clusters, which is equal to 8K. The logical address is mapped to a physical block address via the L2P mapping table, and occupies 4 memory pages (the memory pages n, n+1, n+2 and n+3, the size of each memory page is 2K). This means that there are 4 memory pages in the physical block with invalid data. The data on the other memory pages in the physical block is valid. Furthermore, when the memory is a flash memory, the unit for erasing data is "a block". The size of the invalid data on the logical address does not fully occupy a physical block of the storage device. Therefore, the physical block with valid data cannot be erased.

Figure 6:
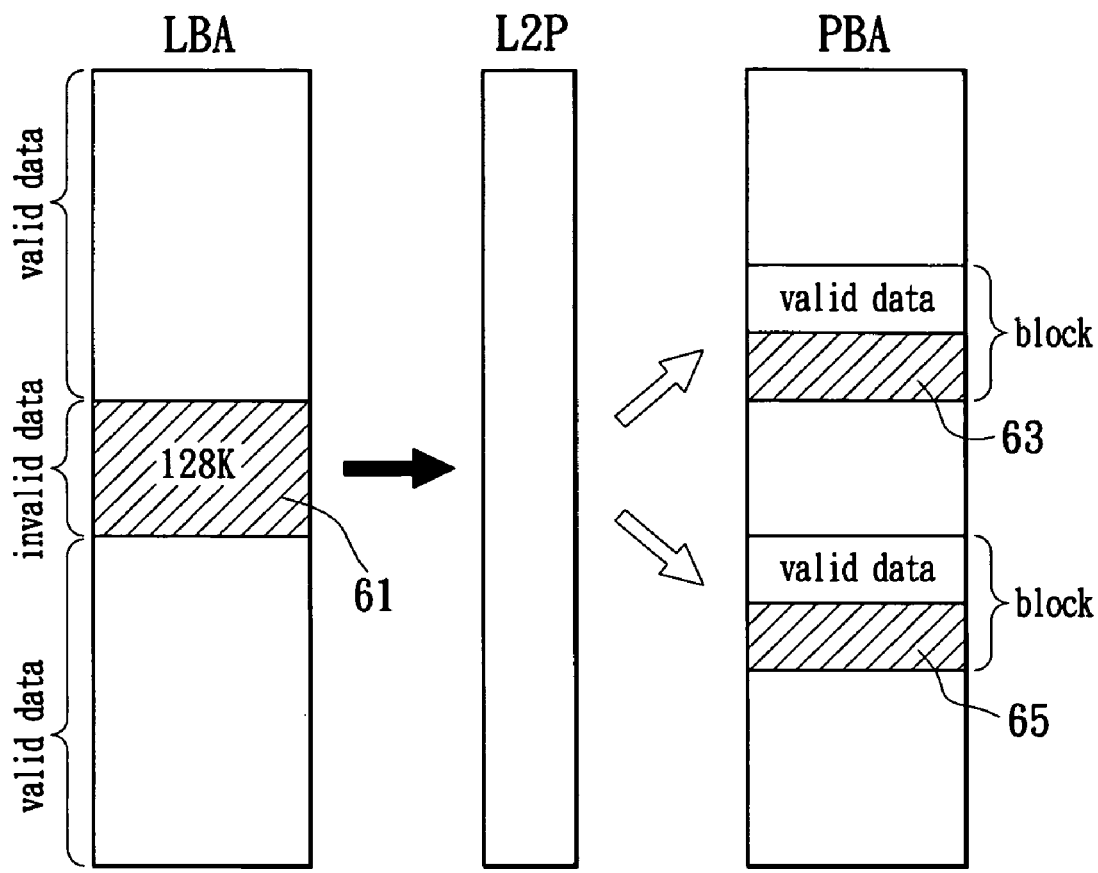
FIG. 6 is a schematic diagram of the logical address block with invalid data that is mapped to the physical block.

Reference is made to FIG. 6, which shows a schematic diagram of the logical address block with invalid data that is mapped to the physical block. In the figure, there are three areas, including logical block address (LBA), L2P mapping table and physical block address (PBA). The L2P mapping table is used for mapping the logical block address to the physical block address.

In the figure, the size of the invalid data 61 (the slash area) in the data area of the logical address is 32 clusters and is equal to 128K. After the logical block address is mapped to the physical block address via the L2P mapping table, the logical block address is allocated to the two physical blocks 63, 65 of the storage device. The two physical blocks 63, 65 both include valid data and invalid data (the slash area). Because the minimum unit for erasing data is a block (that is 128K in the FAT file system), the two physical blocks 63, 65 with valid data and invalid data cannot be erased.

When a physical block has both valid data and invalid data, the invalid data still cannot be erased. Therefore, the conditions for releasing the space of the physical block include both the size of the invalid data on the logical address and the corresponding physical block address.

Figure 7:
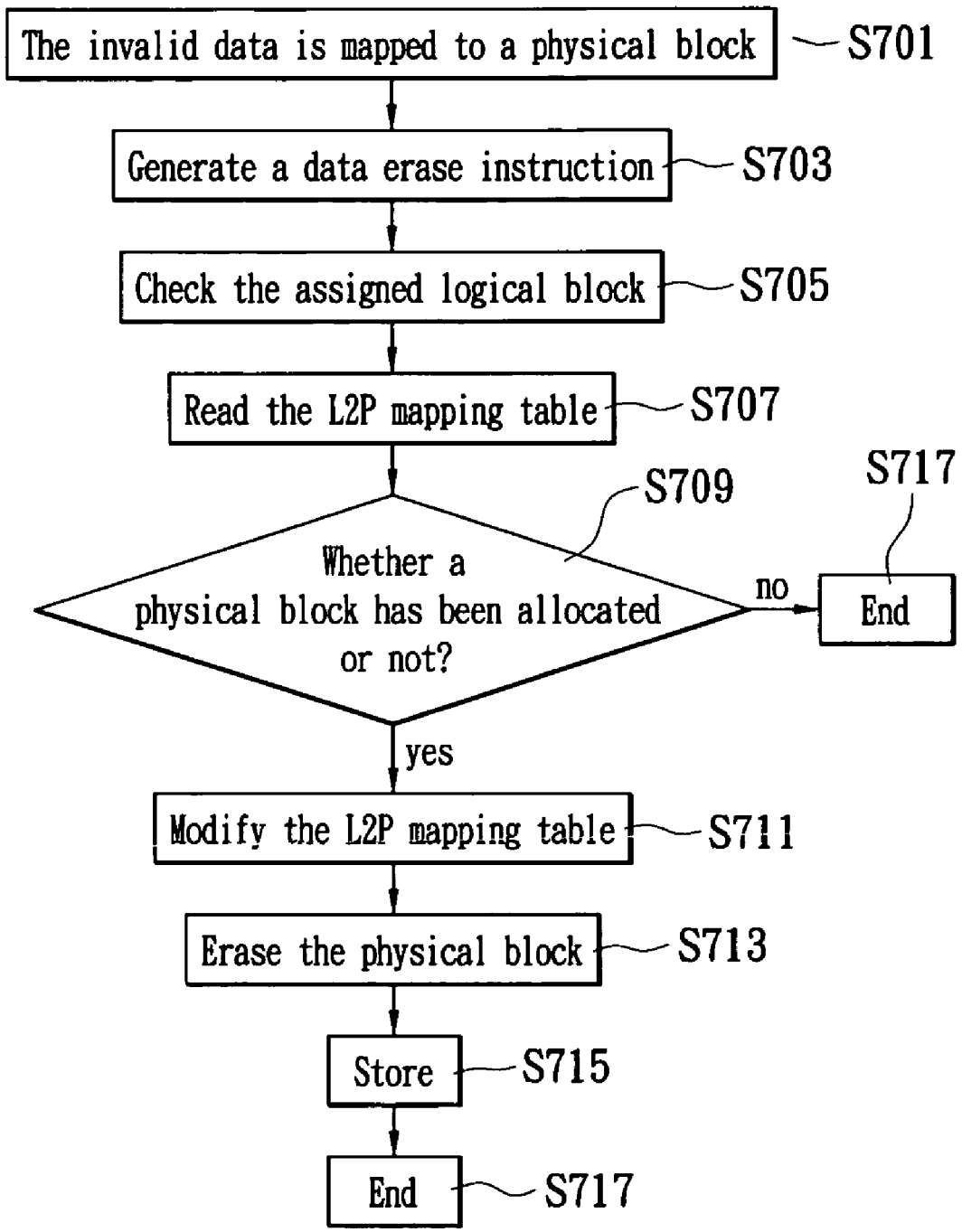
FIG. 7 is a flow chart of the erasing data of the method for memory space management of the present invention.

FIG. 7 shows the flow chart of the erasing data of the method for memory space management of the present invention. It uses the resident program to monitor the storage space and the resource allocation of the file system periodically or according to the user's instruction, including checking the file allocation table, the file label under the directory, or the status of the cluster chains to obtain the storage space and the resource allocation of the file system.

When a logical address with the erased invalid data has been mapped to a full physical block which has the capacity of the continuous space at least equals the capacity of the erase unit of the storage device) (S701), the physical block can be erased. Therefore, a data erase instruction is issued to the controller of the storage device (S703). When the controller receives the data erase instruction, the related steps are executed, including canceling the link relation between the physical block and the logical block, and erasing the physical block to release the memory space.

Next, when the controller of the storage device receives the data erase instruction, the controller checks the logical block indicated by the instruction (S705) and reads the L2P mapping table (S707) to map the logical block to the physical block. Further, it is determined whether the physical memory block allocated in logical block still has the invalid data (i.e. erased data) (S709). When the logical block indicated by the parameter of the instruction is not allocated with a physical memory block, the operation is ended (S717). And when the logical block is allocated with a physical memory block, the controller releases the link relation between the logical block and the physical block via updating/modifying the L2P mapping table (S711).

The controller modifies the record of the L2P mapping table to indicate that the logical block is not allocated with a physical memory block, and then erases the corresponding physical memory block (S713). Furthermore, the location of the file system that has been checked is stored (S715), then the operation is ended (S717). Alternatively, by executing the above procedures, the next location of the file system is checked to release the space of the storage device with invalid data.

The procedures can release the storage space occupied by the invalid data, and do not need to move the invalid data on the physical block when data is updated and during a wear-leveling process, thereby improve the usage life of the storage device.

Figure 8:
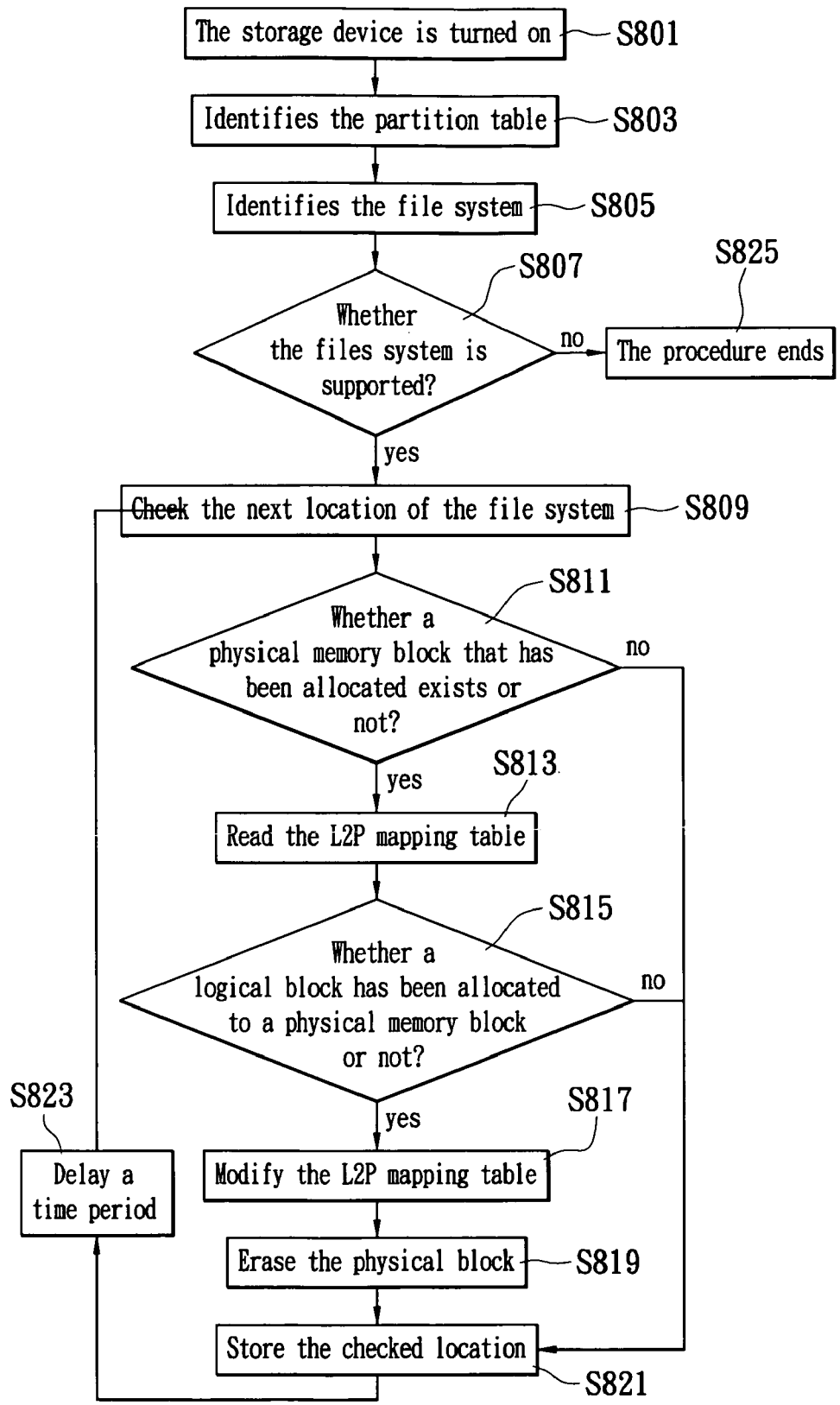
FIG. 8 is a flow chart of the method for memory space management of the present invention.

As shown in FIG. 8, the flow chart of the erasing data is applied to the method for memory space management.

When the system is turned on, the resident program for monitoring the file system operation is loaded. The resident program is used for checking the status of the file system allocation. In addition to the resident program and the controller of the storage device of the system also can automatically perform the identification and check operation, which can only be applied to the file system that the application system formats the storage device with. In other words, the file system can be identified by the controller of the storage device to check whether the valid data is stored on the memory.

Therefore, after the storage device connected with the system is turned on (S801), whether a previous check record exists or not is checked. When no previous check record exists, which indicates that the storage device has been turned on for the first time, then the default value is loaded to check the file system. If it is not the first time, then the last check location is loaded. Next, before the controller checks the file system, the controller identifies the partition table (S803). After the allocation of the storage device is identified, the file system is identified (S805), and determines whether the file system is supported by the controller (S807). When the file system is not supported by the controller, the procedure is ended (S825). Or else, the parameters of the storage device are obtained, including the block size of the storage device, the number of the memory pages of the block, the size of the memory page, the manufacturer information or the device information, etc. Next, the usage status of the file system for the next location is checked (S809), including the file allocation table, the file labels of each directory, and/or the status of the cluster chains. Because the previous check result has been stored, the check is started from the next location of the memory.

According to the partition table and the format of the file system, it is to check the logical block whether a physical memory block in the memory has been occupied with invalid data or not (S811). When the physical memory block that allocated with the logical block does not exist, the check record, such as the check location, is stored (step S821). When the logical block is allocated with a physical memory block, the L2P mapping table is read (S813) and used to determine whether the logical block allocated with a physical block that still has the invalid data (S815).

In the step of S815, if the logical block is not allocated with a physical memory block, the step S821 is executed to store the check record.

In the step of S815, when the logical block that has its file deleted, but there is still allocation with a physical memory block and the physical memory block is fully occupied, the link relation between the logical block address and the physical block address is released via modifying the L2P mapping table (S817), and the physical block is erased (S819).

Finally, the check location is stored (S821). A time period is delayed (S823), the next location of the file system is checked (S809) to continuously perform the next stage memory management procedures.

In the present invention, the capacity of the erase unit is not limited the capacity of the erase unit of the memory. The capacity of the erase unit can be defined by the user.

The present invention is a method for memory space management that uses the resident program loaded into the operation system to monitor the storage space and the status of the file system allocation. By modifying the L2P mapping table between the logical block and the physical block, the physical memory block that is occupied and has the invalid data is released. The access speed of the storage device is improved, and the usage life of the storage medium becomes longer.

The description above only illustrates specific embodiments and examples of the present invention. The present invention should therefore cover various modifications and variations made to the herein-described structure and operations of the present invention, provided they fall within the scope of the present invention as defined in the following appended claims.

What is claimed is:

1. A method for memory space management, comprising:
   identifying a partition table and file system of a storage device when the storage is turned on;
      monitoring allocation of invalid data stored in the storage device having a plurality of physical blocks;
   after a step of determination, while a size of the invalid data stored in the one or more physical blocks is equal to or larger than a default capacity of the one or more physical blocks occupied by the invalid data, modifying a logical to physical (L2P) mapping table to cancel a link relation between the one or more physical blocks and the corresponding logical address occupied by the invalid data.

2. The method for memory space management as claimed in claim 1, further comprising:
   loading a resident program for determining whether the physical block corresponding to the logical address allocated with the invalid data is occupied by the invalid data.

3. The method for memory space management as claimed in claim 1, wherein the storage device further comprises a controller.

4. The controller of the storage device in claim 3, wherein identifying the file system of the storage device further comprises:
   determining whether the controller is supportive of the file system; and
   when the controller is supportive of the file system obtaining parameters of the storage device.

5. The method for memory space management as claimed in claim 4, wherein the parameters of the storage device include a block size of the storage device, a number of memory pages in the physical block, and a size of the memory page.

6. The method for memory space management as claimed in claim 4, after turning on the storage device further comprising:
   when the storage device is turned on for the first time loading a default value to check the file system.

* * * * *